United States Patent [19]

Turnbull et al.

[11] Patent Number: 5,732,973
[45] Date of Patent: Mar. 31, 1998

[54] TUCK FOLDED AIR BAG

[75] Inventors: Roy C. Turnbull, Troy; Bonnie L. Maier, Capac, both of Mich.

[73] Assignee: TRW Vehicle Safety Systems Inc., Lyndhurst, Ohio

[21] Appl. No.: 681,161

[22] Filed: Jul. 22, 1996

[51] Int. Cl.$^6$ ............................................. B60R 21/16
[52] U.S. Cl. .............................. 280/743.1; 280/730.1
[58] Field of Search ........................ 280/743.1, 728.1, 280/729, 732, 730.1, 743.2

[56] References Cited

U.S. PATENT DOCUMENTS

| | | | |
|---|---|---|---|
| 4,186,941 | 2/1980 | Scholz et al. | 280/743.1 |
| 5,205,583 | 4/1993 | Henseler et al. | 280/743.1 |
| 5,290,061 | 3/1994 | Bollaert | 280/743.1 |
| 5,405,166 | 4/1995 | Rogerson | 280/743.1 |
| 5,454,595 | 10/1995 | Olson et al. | 280/743.1 |
| 5,549,326 | 8/1996 | Rodriguez Ramos | 280/743.1 |
| 5,562,302 | 10/1996 | Turnbull | 280/743.1 |
| 5,599,040 | 2/1997 | Takahashi et al. | 280/743.1 |

FOREIGN PATENT DOCUMENTS

| | | | |
|---|---|---|---|
| 2 030 863 | 12/1971 | Germany | 280/743.1 |
| 3-67748 | 3/1991 | Japan | 280/743.1 |
| 4-166453 | 6/1992 | Japan | 280/743.1 |

*Primary Examiner*—Peter C. English
*Attorney, Agent, or Firm*—Tarolli, Sundheim, Covell, Tummino & Szabo

[57] ABSTRACT

An air bag (10) comprises an elongate panel (20) having first and second longitudinally extending side portions (40,50) and a longitudinally extending central portion (60). The panel (20) has first and second opposite end portions (70, 80). A first side seam (102) extends along the first side portion (40) of the panel (20). A second side seam (104) extends along the second side portion (50) of the panel (20). A transverse seam (100) joins the first end portion (70) of the panel (20) to the second end portion (80) of the panel. The seams (100, 102, 104) provide the air bag (10) with a pillow-shaped configuration when inflated. The first side portion (40) of the panel (20) is tucked inside the central portion (60) of the panel and is sewn to the central portion with a first tearable stitching section (110) when the air bag (10) is in the deflated condition. The first tearable stitching section (110) is tearable in response to the application of a force greater than a predetermined force due to inflation of the air bag (10) to enable movement of the first side portion (40) from the tucked position to an inflated position extending laterally outward from the central portion (60).

6 Claims, 3 Drawing Sheets

TUCK FOLDED AIR BAG

BACKGROUND OF THE INVENTION

1. Technical Field

The present invention relates to an inflatable vehicle occupant protection device, and is particularly directed to an air bag for helping to protect a vehicle occupant in the event of a vehicle collision.

2. Description of the Prior Art

It is known to inflate an air bag to help protect a vehicle occupant in the event of an impact to a vehicle of a magnitude above a predetermined threshold. The air bag is stored in a deflated condition, together with an inflator, in a portion of the vehicle such as the instrument panel. In the event of an impact to the vehicle of a magnitude above the predetermined threshold, the inflator is actuated, and the air bag is inflated into a position adjacent to the vehicle occupant. The air bag can help to protect the vehicle occupant from forcefully striking or being struck by parts of the vehicle.

An air bag which inflates from an instrument panel of a vehicle typically expands both vertically and laterally as it moves from the deflated condition to the inflated condition. It may be desirable that the air bag inflate vertically as quickly as possible, prior to inflating laterally, to help to protect an out of position vehicle occupant.

SUMMARY OF THE INVENTION

The present invention is an inflatable vehicle occupant protection device for helping to protect an occupant of a vehicle. The protection device is inflatable from a deflated condition to an inflated, occupant protecting condition by inflation fluid from an inflation fluid source. The protection device comprises an elongate panel of material having first and second longitudinally extending side portions and a longitudinally extending central portion extending between the first and second side portions. The panel has first and second opposite end portions. The protection device includes a first side seam extending along the first side portion of the panel, a second side seam extending along the second side portion of the panel, and means for joining the first end portion of the panel to the second end portion of the panel. The protection device has a pillow-shaped configuration when inflated.

The first side portion of the panel is tucked inside the central portion of the panel and is sewn to the central portion with a first tearable stitching section when the inflatable device is in the deflated condition. The first tearable stitching section is tearable in response to the application of a force greater than a predetermined force due to inflation of the protection device to enable movement of the first side portion of the panel from the tucked position to an inflated position extending laterally outward from the central portion.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENT

Figure 1:
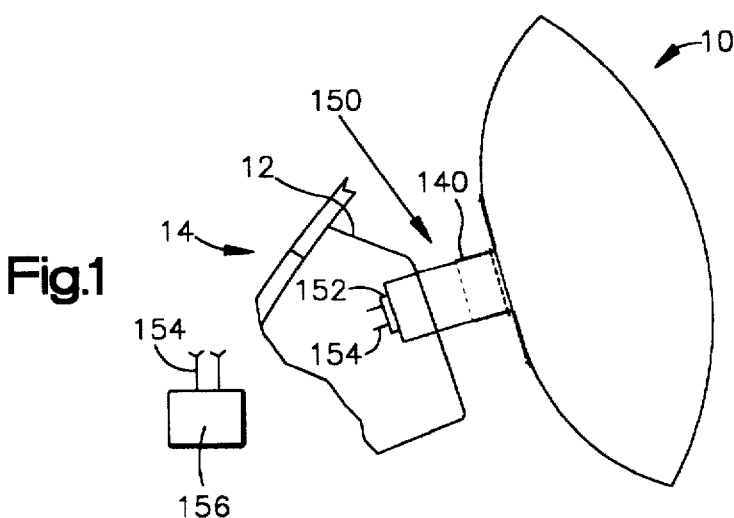
FIG. 1 is a schematic side view of an air bag module including an air bag constructed in accordance with the present invention shown in an inflated, occupant protecting condition.

The present invention relates to an inflatable vehicle occupant protection device, and is particularly directed to a protection device for helping to protect a vehicle occupant in the event of a vehicle collision. As representative of the present invention, FIG. 1 illustrates a specific inflatable vehicle occupant protection device 10 of the type commonly known as an "air bag". The air bag 10 is illustrated as being inflatable from an instrument panel 12 of a vehicle 14 to help protect an occupant of the vehicle from contact with parts of the vehicle. The air bag 10 is a "pillow" type air bag which is mounted in the vehicle 14 in a mid-mount configuration. It should be understood that the present invention is applicable to other air bag and mounting configurations as well.

Figure 2:
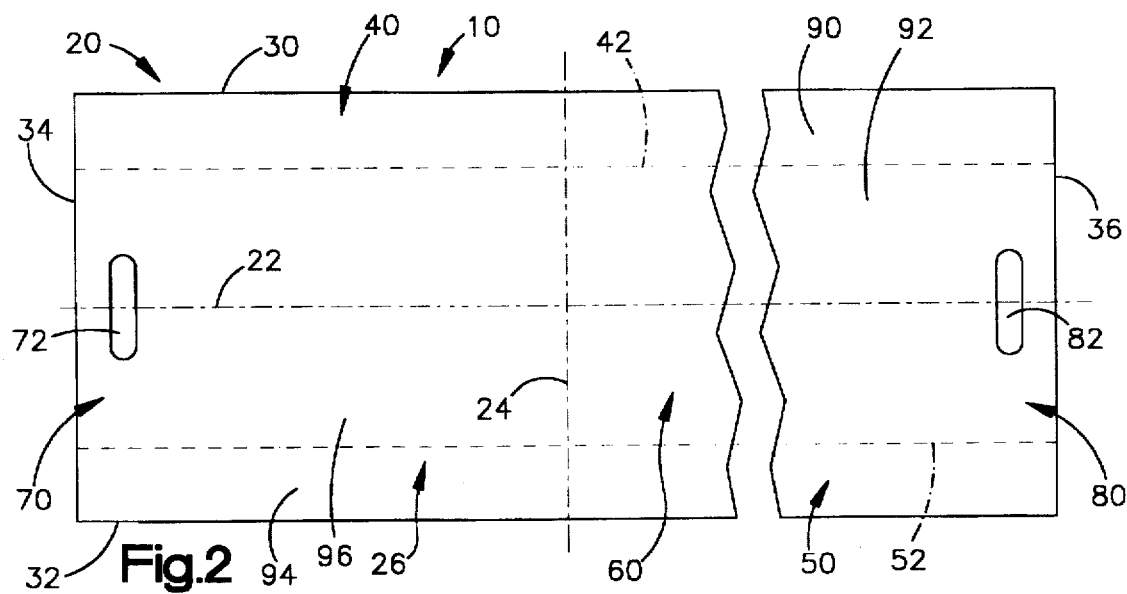
FIG. 2 is a plan view of the inner side surface of a panel of fabric material in a condition prior to being folded and sewn to make the air bag of FIG. 1.
Figure 3:
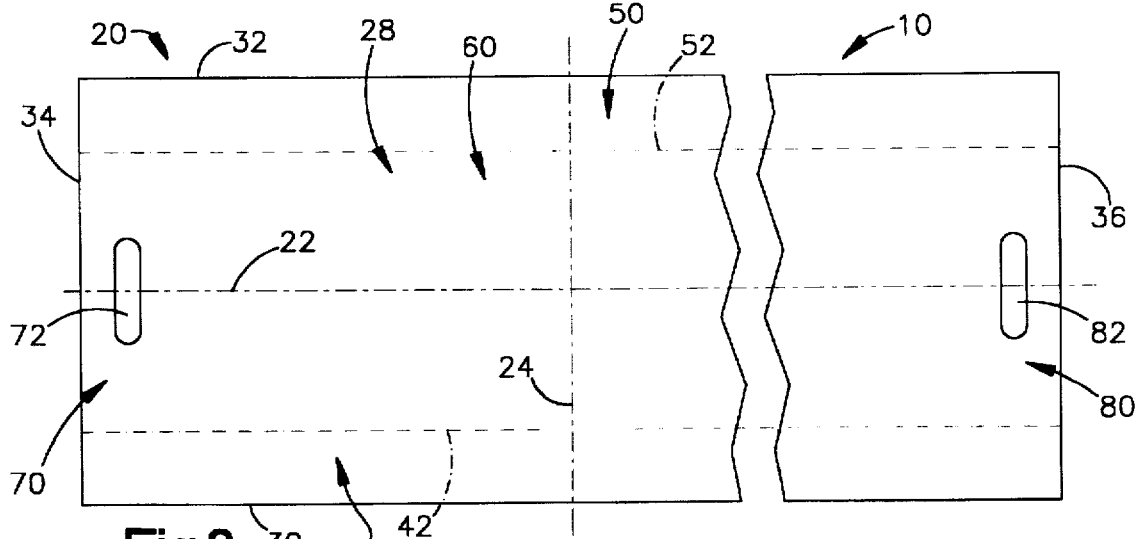
FIG. 3 is a view similar to FIG. 2 of the outer side surface of the panel.

The air bag 10 is made from a single panel 20 (FIG. 2) of fabric material, preferably woven nylon, which is folded and sewn to form the air bag. The panel 20 (FIG. 2) has a longitudinal central axis 22. A transverse axis 24 of the panel 20 extends perpendicular to the longitudinal axis 22. The panel 20 has an inner major side surface 26 (FIG. 2) and an opposite outer major side surface 28 (FIG. 3)

The panel 20 is generally rectangular in configuration including first and second opposite side edges 30 and 32 which extend parallel to the longitudinal axis 22. The panel 20 also has first and second opposite end edges 34 and 36 which extend between and interconnect the side edges 30 and 32.

The panel 20 has a longitudinally extending first side portion 40. The first side portion 40 of the panel 20 is defined by the first side edge 30 and an imaginary line 42 which extends parallel to the first side edge at a location between the first side edge and the longitudinal axis 22. A longitudinally extending second side portion 50 of the panel 20 is defined by the second side edge 32 and an imaginary line 52 which extends parallel to the second side edge at a location between the second side edge and the longitudinal central axis 22. A longitudinally extending central portion 60 of the panel 20 is disposed between the first and second side portions 40 and 50, that is, between the imaginary lines 42 and 52.

The panel 20 has a first end portion 70 which includes the first end edge 34 of the panel. An elongate inflation fluid opening 72 is formed in the first end portion 70 of the panel 20, at a location adjacent to the first end edge 34. A second end portion 80 of the panel includes the second end edge 36 of the panel. An elongate inflation fluid opening 82 is formed in the second end portion 80 of the panel 20, at a location adjacent to the second end edge 36.

The inflation fluid opening 82 in the second end portion 80 of the panel 20 is identical in configuration to the inflation fluid opening 72 in the first end portion 70 of the panel. The inflation fluid openings 72 and 82 are centered on the longitudinal axis 22 of the panel 20. The inflation fluid openings 72 and 82 communicate with an inflation fluid volume 84 (FIG. 8) which is formed when the panel 20 is folded and sewn to make the air bag 10.

The inner major side surface 26 (FIG. 2) of the panel 20 includes a first section 90 on the first side portion 40 of the panel. A second section 92 of the inner major side surface 26 of the panel 20 is disposed on an adjacent part of the central portion 60 of the panel. The inner major side surface 26 also includes a third section 94 on the second side portion 50 of the panel 20. A fourth section 96 of the inner major side surface 26 of the panel 20 is disposed on an adjacent part of the central portion 60 of the panel 20.

Figure 4:
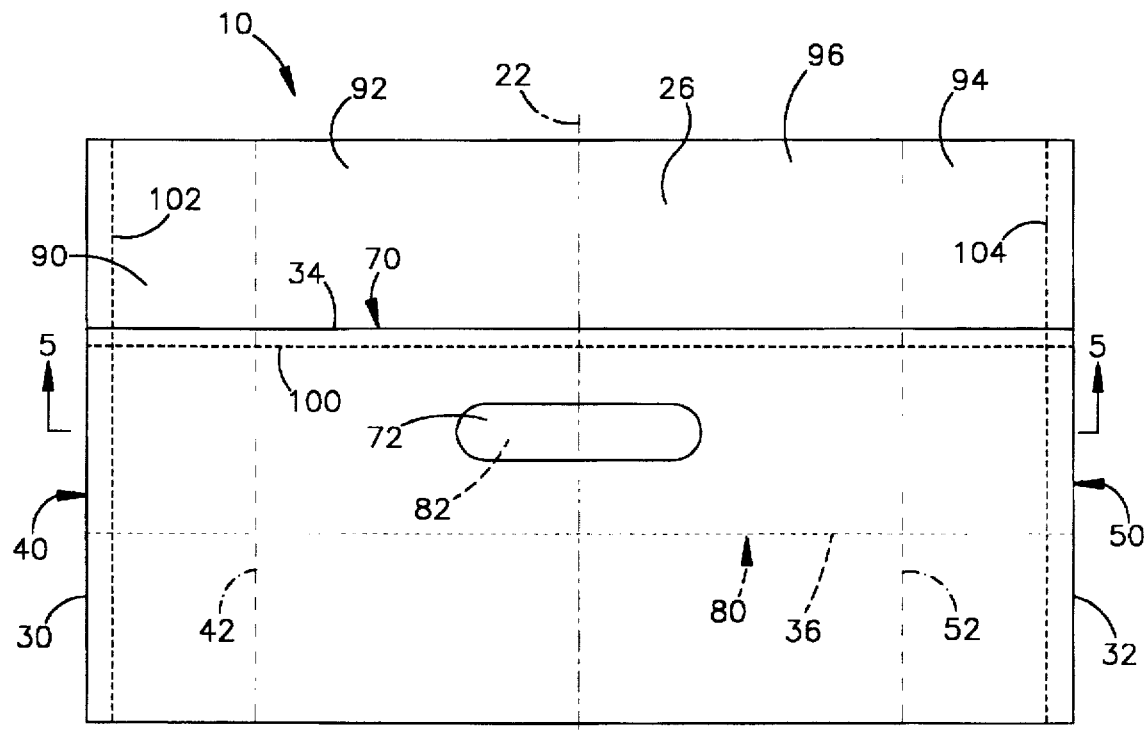
FIG. 4 is a view of the air bag in a partially sewn condition prior to being tuck folded.
Figure 5:
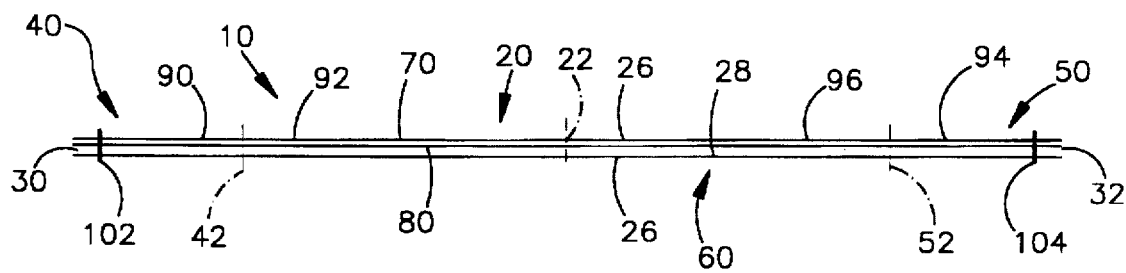
FIG. 5 is a schematic view taken along line 5—5 of FIG. 4.

The panel 20 is initially folded as seen in FIG. 4, with the inner side surface 26 on the outside, so that the first end portion 70 of the panel 20 overlies the second end portion 80. The inflation fluid opening 72 in the first end portion 70 of the panel 20 is aligned with and overlies the inflation fluid opening 82 in the second end portion 80 of the panel. A transverse seam 100 joins the first end portion 70 of the panel 20 to the second end portion 80 of the panel.

The panel 20 is also sewn along its side edges with first and second side seams 102 and 104. The first side seam 102 extends along the first side portion 40 of the panel 20. The second side seam 104 extends along the second side portion 50 of the panel 20. The air bag 10 as thus sewn has a pillow-shaped configuration when inflated.

The sewn air bag 10 is then inverted or turned "right side out" (FIG. 6) so that the outer side surface 28 of the panel 20 is on the outside of the air bag. The seam allowance at the first and second side seams 102 and 104 is disposed inside the inflation fluid volume 84.

Figure 6:
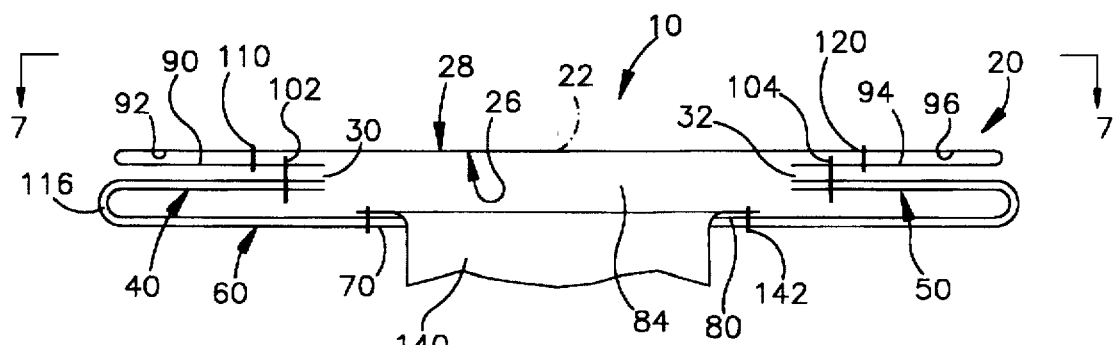
FIG. 6 is a schematic sectional view of the air bag of FIG. 4 in an inverted condition after being tuck folded and sewn.
Figure 7:
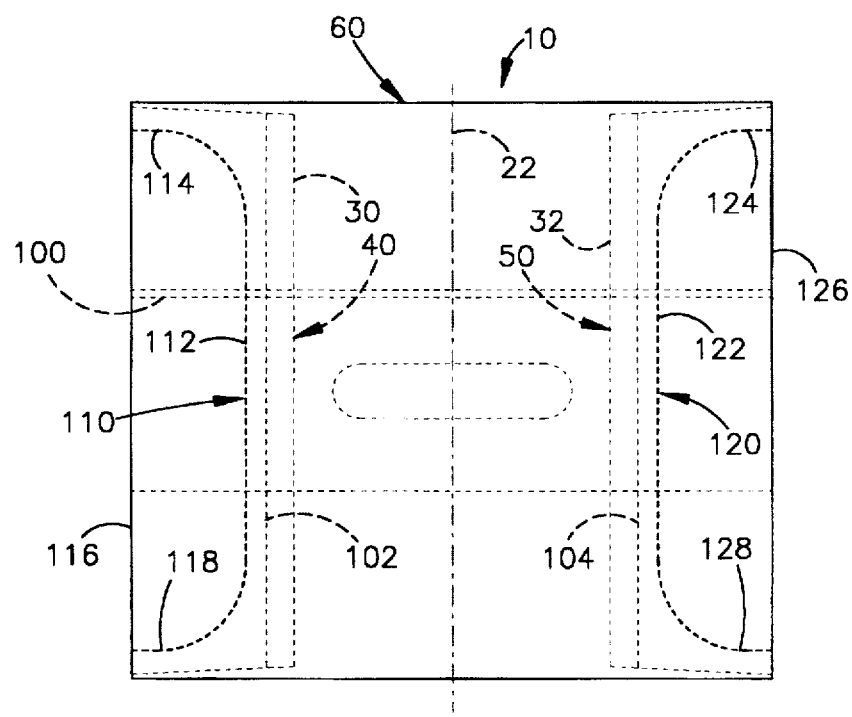
FIG. 7 is a view of the air bag of FIG. 6 taken generally along line 7—7 of FIG. 6.

After the air bag 10 is inverted, the first side portion 40 of the panel 20 is tucked inside the central portion 60 of the panel, in a direction toward the longitudinal central axis 22, as shown schematically in FIG. 6. In other words, the first side portion 40 is tucked between the overlying layers of the central portion 60 with the side portion 40 disposed in two layers. The first side portion 40 is tucked in far enough to reduce the width of the air bag 10 significantly. The first side edge 30 of the panel 20 forms a laterally inward (from left to right as viewed in FIGS. 6–9) edge of the tucked first side portion 40 of the panel.

The first side portion 40 of the panel 20 is sewn to the central portion 60 of the panel with a first tearable stitching section 110. The first tearable stitching section 110 has a C-shaped configuration (FIG. 7) including a base portion 112 which extends parallel to the first side seam 102. The base portion 112 of the first tearable stitching section 110 is disposed adjacent to the laterally inward edge 30 of the tucked first side portion 40 of the panel 20. The first side seam 102 is disposed intermediate the first tearable stitching section 110 and the laterally inward edge 30 of the tucked first side portion 40.

The C-shaped configuration of the first tearable stitching section 110 also includes a first arm portion 114 which extends laterally outward from the base portion 112, in a direction toward the outer side edge 116 of the tucked first side portion 40 of the panel 20. A second arm portion 118 of the first tearable stitching section 110 extends laterally outward from the base portion 112, in a direction toward the outer side edge 116 of the tucked first side portion 40 of the panel 20.

The first tearable stitching section 110 comprises a plurality of stitches which extend through the first side portion 40 of the panel and through the central portion 60 of the panel. The plurality of stitches extend from the outer major side surface 28 (FIG. 6) on the first side portion 40 of the panel 20, through the abutting first and second sections 90 and 92 of the inner major side surface 26 of the panel, and through the outer major side surface 28 on the adjacent part of the central portion 60 of the panel. The stitches only extend through one layer of the first side portion 40 of the panel 20, not both layers.

The second side portion 50 of the panel 20 is also tucked inside the central portion of the panel, in a direction toward the longitudinal central axis 22, as shown schematically in FIG. 6. In other words, the first side portion 40 is tucked between the overlying layers of the central portion 60 with the side portion 40 disposed in two layers. The second side portion 50 is tucked in far enough to reduce the width of the air bag 10 significantly. The second side edge 32 of the panel 20 forms a laterally inward (from right to left as viewed in FIGS. 6–9) edge of the tucked second side portion 50 of the panel.

The second side portion 50 of the panel 20 is sewn to the central portion 60 of the panel with a second tearable stitching section 120. The second tearable stitching section 120 has a C-shaped configuration (FIG. 7) including a base portion 122 which extends parallel to the second side seam 104. The base portion 122 of the second tearable stitching section 120 is disposed adjacent to the laterally inward edge 32 of the tucked second side portion 50 of the panel 20. The second side seam 104 is disposed intermediate the second tearable stitching section 120 and the laterally inward edge 32 of the tucked second side portion 50.

The C-shaped configuration of the second tearable stitching section 120 also includes a first arm portion 124 which extends laterally outward from the base portion 122, in a direction toward the outer side edge 126 of the tucked second side portion 50 of the panel 20. A second arm portion 128 of the second tearable stitching section 120 extends laterally outward from the base portion 122, in a direction toward the outer side edge 126 of the tucked second side portion 50 of the panel 20.

The second tearable stitching section 120 comprises a plurality of stitches which extend through the second side portion 50 of the panel 20 and through the central portion 60 of the panel. The plurality of stitches extend from the outer major side surface 28 on the second side portion 50 of the panel 20, through the abutting third and fourth sections 94 and 96 of the inner major side surface 26 of the panel, and through the outer major side surface 28 on the adjacent part of the central portion 60 of the panel. The stitches only extend through one layer of the second side portion 50 of the panel 20, not both layers.

The stitches which form the first and second tearable stitching sections 110 and 120 are tearable in response to the application of a force greater than a predetermined force. The predetermined force, as described below, is exceeded at a time when the air bag 10 is partially but not yet fully inflated.

A tubular attachment panel 140 (FIG. 6) is sewn to the panel 20 in a known manner with a stitching section 142. The assembled air bag 10 is thereafter folded in a known manner (not shown) and mounted in the instrument panel 12 of the vehicle 14 as a portion of an air bag module indicated schematically at 150. The module 150 includes, in addition to the air bag 10, an inflator indicated schematically at 152. The inflator 152 is connected by lead wires 154 with known electric circuitry of the vehicle indicated schematically at 156 which includes a power such source, such as the vehicle battery, and a collision sensor.

In the event of a vehicle collision of a magnitude for which inflation of the air bag 10 is desired to help protect the vehicle occupant, the vehicle electric circuitry 156 causes electric current to be supplied over the lead wires 154 to the inflator 152. The inflator 152 is actuated in a known manner and directs inflation fluid under pressure into the air bag 10. The air bag 10 inflates from a folded, stored condition to an inflated condition in the manner illustrated schematically in FIGS. 8 and 9.

Figure 8:
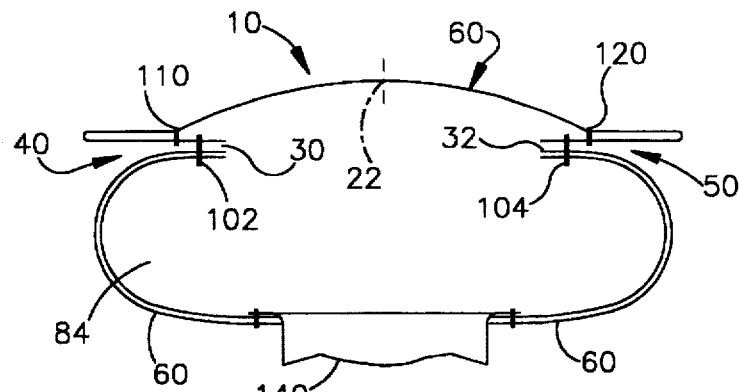
FIG. 8 is a schematic view showing the air bag in a partially inflated condition.

The air bag 10 inflates in a direction away from the inflation fluid openings 72 and 82, vertically as illustrated in FIG. 8, and assumes a partially inflated condition, as shown in FIG. 8. The pressure of the inflation fluid in the air bag 10 is transmitted into the first and second tearable stitching sections 110 and 120. Initially, the force on the tearable stitching sections 110 and 120 is not greater than the predetermined force. That is, the resistance to tearing of the first and second tearable stitching sections 110 and 120 is sufficient to maintain the side portions 40 and 50 of the air bag 10 sewn to the central portion 60 of the air bag until the air bag is inflated vertically.

After the air bag 10 is inflated vertically to the extent shown in FIG. 8, the force of the inflation fluid in the air bag, applied to the first and second tearable stitching sections 110 and 120, exceeds the predetermined force. The stitches of the first and second tearable stitching sections 110 and 120 tear.

Figure 9:
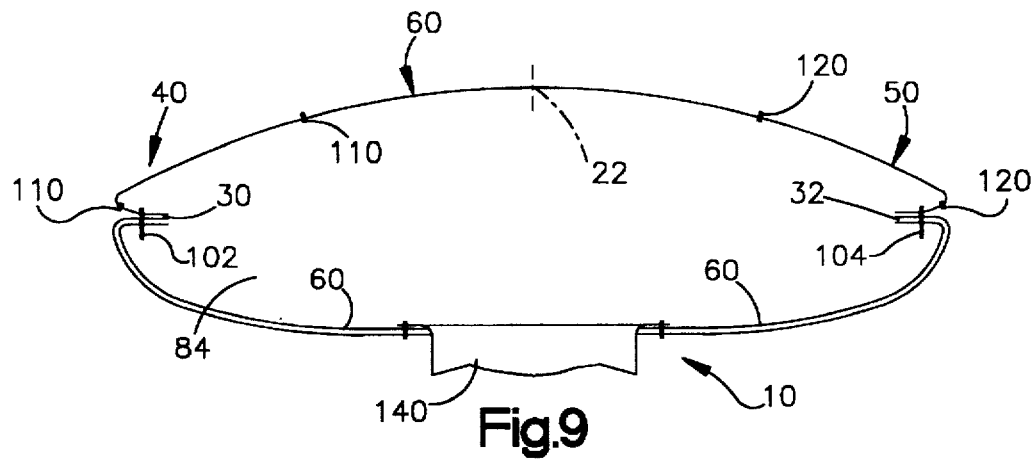
FIG. 9 is a schematic view showing the air bag in a fully inflated condition.

When the first tearable stitching section 110 tears, the first side portion 40 of the air bag 10 is released for movement relative to the central portion 60 of the air bag. The first side portion 40 of the air bag then inflates laterally outward as illustrated in FIG. 9, in a direction that is generally perpendicular to the direction in which the air bag 10 initially inflates. When the second tearable stitching section 120 tears, the second side portion 50 of the air bag 10 is released for movement relative to the central portion 60 of the air bag. The second side portion 50 of the air bag 10 then inflates laterally outward as illustrated in FIG. 9. The air bag 10 assumes a fully inflated condition.

In one exemplary air bag 10 which has been constructed in accordance with the present invention, the air bag has a width, when laid flat, of about 1,000 to 1,100 millimeters between the first side seam 102 and the second side seam 104. The exemplary air bag 10 has one side portion tucked in 160 mm. That is, the distance between the outermost edge of the tucked air bag, and the side seam, is 160 mm. The other side portion of the exemplary air bag is tucked in 110 mm.

From the above description of the invention, those skilled in the art will perceive improvements, changes and modifications in the invention. For example, the panel 20 may be pleated at the top and bottom prior to tucking in the side portions. The stitching sections can be single needle or double needle as appropriate. Also, the tearable stitching sections can extend through the multiple layers of the seam allowance on the tucked side portions of the bag, rather than through only a single layer of the tucked side portions as shown in the drawings. Such improvements, changes and modifications within the skill of the art are intended to be covered by the appended claims.

Having described the invention, we claim:

1. An inflatable vehicle occupant protection device for helping to protect an occupant of a vehicle, said protection device being inflatable from a deflated condition to an inflated, occupant protecting condition by inflation fluid from an inflation fluid source, said protection device comprising:

an elongate panel of material having first and second longitudinally extending side portions and a longitudinally extending central portion between said first and second side portions, said panel having first and second opposite end portions;

said protection device also comprising means for joining said first end portion of said panel to said second end portion of said panel, a first side seam extending along said first side portion of said panel, and a second side seam extending along said second side portion of said panel, said means for joining and said first and second side seams providing said protection device with a pillow-shaped configuration when inflated;

said first side portion of said panel being tucked inside said central portion of said panel to form two layers of material of said first side portion disposed inside said central portion of said panel, said first side portion being sewn to said central portion with a single first tearable stitching section when said protection device is in the deflated condition, said single first tearable stitching section extending through only one of said two layers of material of said tucked first side portion;

said single first tearable stitching section being tearable in response to the application of a force greater than a predetermined force due to inflation of said protection device to enable movement of said first side portion of said panel from the tucked position to an inflated position extending laterally outward from said central portion;

said single first tearable stitching section being disposed adjacent to a laterally inward edge of said tucked first side portion to form a flap of material disposed outside the remainder of said protection device, said flap defining an inflatable volume which is blocked from inflation when said single first tearable stitching section is untorn, said flap of material including said one layer of material of said tucked first side portion.

2. A protection device as set forth in claim 1 wherein said first side seam is disposed intermediate said single first tearable stitching section and said laterally inward edge of said tucked first side portion.

3. A protection device as set forth in claim 1 wherein said second side portion of said panel is tucked inside said central portion of said panel and is sewn to said central portion with a second tearable stitching section when said protection device is in the deflated condition, said second tearable stitching section being tearable in response to the application of a force greater than the predetermined force due to inflation of said protection device to enable movement of said second side portion of said panel from the tucked position to an inflated position extending laterally outward from said central portion.

4. A protection device as set forth in claim 3 wherein said single tearable stitching section is disposed adjacent to the laterally inward edge of said tucked first side portion and said second tearable stitching section is disposed adjacent to a laterally inward edge of said tucked second side portion.

5. An inflatable vehicle occupant protection device for helping to protect an occupant of a vehicle, said protection device being inflatable from a deflated condition to an inflated, occupant protecting condition by inflation fluid from an inflation fluid source, said protection device comprising:

an elongate panel of material having first and second longitudinally extending side portions and a longitudinally extending central portion between said first and second side portions, said panel having first and second opposite end portions;

said protection device also comprising means for joining said first end portion of said panel to said second end portion of said panel, a first side seam extending along said first side portion of said panel, and a second side seam extending along said second side portion of said panel, said means for joining and said first and second side seams providing said protection device with a pillow-shaped configuration when inflated;

said first side portion of said panel being tucked inside said central portion of said panel and being sewn to said central portion with a first tearable stitching section when said protection device is in the deflated condition;

said first tearable stitching section being tearable in response to the application of a force greater than a predetermined force due to inflation of said protection device to enable movement of said first side portion of said panel from the tucked position to an inflated position extending laterally outward from said central portion;

wherein said first tearable stitching section has a C-shaped configuration including (a) a base portion extending parallel to said first side seam at a location adjacent to a laterally inward edge of said tucked first side portion of said panel and (b) two arm portions extending laterally outward from said base portion in a direction toward an outer side edge of said tucked first side portion.

6. A protection device for helping to protect an occupant of a vehicle, said protection device being inflatable from a deflated condition to an inflated, occupant protecting condition by inflation fluid from an inflation fluid source, said protection device comprising:

an elongate panel of material having a longitudinal central axis and having first and second longitudinally extending side portions and a longitudinally extending central portion between said first and second side portions, said panel having first and second opposite end portions;

said panel having opposite inner and outer major side surfaces, said inner major side surface including a first section on said first side portion of said panel and a second section on an adjacent part of said central portion of said panel;

said protection device also comprising means for joining said first end portion of said panel to said second end portion of said panel, a first side seam extending along said first side portion of said panel, and a second side seam extending along said second side portion of said panel, said means for joining and said first and second side seams providing said protection device with a pillow-shaped configuration when inflated;

said first side portion of said panel being folded laterally inward toward said axis when said protection device is in the deflated condition so that the first and second sections of said inner major side surface of said panel overlie each other and are in abutting engagement with each other;

said protection device further comprising a first tearable stitching section including a plurality of stitches which extend from said outer major side surface on said first side portion through said abutting first and second sections of said inner major side surface and through said outer major side surface on said adjacent part of said central portion of said panel;

said first tearable stitching section being tearable in response to the application of a force greater than a predetermined force due to inflation of said protection device to enable movement of said first side portion of said panel from the folded position to an inflated position extending laterally outward from said central portion;

wherein said first tearable stitching section has a C-shaped configuration including (a) a base portion extending parallel to said first side seam at a location adjacent to a laterally inward edge of said folded first side portion of said panel and (b) two arm portions extending laterally outward from said base portion in a direction toward an outer side edge of said folded first side portion.

* * * * *